United States Patent
Pozzi et al.

(10) Patent No.: US 7,435,281 B2
(45) Date of Patent: Oct. 14, 2008

(54) PYROMETALLURGIC PROCESS FOR THE TREATMENT OF STEELWORK RESIDUES

(75) Inventors: Marcello Pozzi, Santa Maria Hoeé (IT); Carlo Raggio, Camogli (IT); Loredana Di Sante, Genzano Di Roma (IT)

(73) Assignee: Techint Compagnia Tecnica Internazionale S.p.A., Milan (IT)

( * ) Notice: Subject to any disclaimer, the term of this patent is extended or adjusted under 35 U.S.C. 154(b) by 634 days.

(21) Appl. No.: 11/055,565

(22) Filed: Feb. 10, 2005

(65) Prior Publication Data
US 2005/0188787 A1 Sep. 1, 2005

(30) Foreign Application Priority Data
Feb. 20, 2004 (IT) .......................... MI2004A0283

(51) Int. Cl.
C22B 4/00 (2006.01)
(52) U.S. Cl. ..................... 75/10.38; 75/10.35; 75/10.46
(58) Field of Classification Search ................ 75/10.35, 75/10.15, 10.38, 10.46
See application file for complete search history.

(56) References Cited

U.S. PATENT DOCUMENTS

| | | | | |
|---|---|---|---|---|
| 4,372,780 | A | * | 2/1983 | Madelin ..................... 75/10.29 |
| 4,725,307 | A | | 2/1988 | Harada |
| 5,282,881 | A | | 2/1994 | Baldock et al. |
| 6,136,059 | A | * | 10/2000 | Zoppi ........................ 75/10.15 |

FOREIGN PATENT DOCUMENTS

| | | |
|---|---|---|
| DE | 28 29 370 | 1/1979 |
| DE | 36 16 868 | 12/1986 |
| EP | 0 007 856 | 2/1980 |
| EP | 0 605 378 | 7/1994 |
| EP | 0 716 153 | 6/1996 |
| JP | 57-120635 | 7/1982 |
| WO | WO 00/75385 | 12/2000 |

OTHER PUBLICATIONS

EPO Search Report, no date.
Database WPI, Section Ch, week 198235, Derwent Publication Ltd. ,London, GB; AN 1982-73727E, XP-002330885-& JP 57-120639 Jul. 27, 1982 Abstract.
Database WPI, Section Ch, week 198449,Derwent Publication Ltd., London, GB; AN 1984, -306259, XP002330886, & SU 1 089 154 Apr. 30, 1984—Abstract, Dec. 1984.

* cited by examiner

Primary Examiner—Scott Kastler
(74) Attorney, Agent, or Firm—James V. Costigan; Hedman & Costigan, P.C.

(57) ABSTRACT

A pyrometallurgic process for the treatment of post-steelwork residues, comprises the following phases: preparing a furnace (1) of the electric type, suitable for the introduction of the residues; preparing the residues, for example in a hopper with the possibility of mixing with additives and reaction elements; introducing the residues, together with suitable additives and chemical reagents, into the furnace (1); introducing directly into the slag, by means of lances (4), additives, flushing and reaction elements to correct the composition of the slag (7); reacting the residues with the slag (7) to obtain: a) separation of the liquid metallic phases which are added to the metal bath (6) to form a sellable liquid metal; b) separation of the metallic volatile elements in vapour phase which, when transferred to the free zone of the furnace (1) recombine with the oxygen for the formation of oxides and consequently of powder.

18 Claims, 3 Drawing Sheets

PYROMETALLURGIC PROCESS FOR THE TREATMENT OF STEELWORK RESIDUES

The present invention relates to a pyrometallurgic process for the treatment of post-steelwork residues.

In particular the invention relates to a pyrometallurgic process for the treatment of residues and slag marked by a high environment impact deriving from post-steelwork processes.

Post-steelwork residues refer to the residues and slag deriving from processes not destined themselves for the production of ferrous materials but resulting, for example, from the recycling of by-products of steelwork processes.

The invention therefore relates to a pyrometallurgic treatment for the inertization and recovery of residues obtained from processes used for the extraction of valuable metals coming from residues and slag formed electric arc furnaces (EAF) in their functioning (subsequently defined as "residues").

The Waelz process, in particular, is an example of a whole group of processes which, during the recovery of heavy metals contained in powders from EAF steelwork furnaces, produce, in turn, a considerable quantity of residues with a high environmental impact and, as such, are considered as "special waste" and are therefore subject to regulations and precautionary measures which increase their movement, storage and disposal costs.

A large fraction of the annual world steel production comes from electric arc furnaces also due to the possibility they offer of recycling scrap iron.

During steelwork processes for the production of steel and/or cast iron by means of an EAF, large quantities of processing scraps are generated, also in the form of powders containing elements with a strong environmental impact.

The use of scrap iron zincated or protected with lead paints as raw material for the production of steel and iron alloys in EAF processes, greatly increases the content of heavy metals such as, for example, zinc, lead and cadmium in the EAF powders.

These elements are in fact extremely volatile and reactive in their metallic form. During the steelwork process, they tend to evaporate and react with the oxygen present in the environment of the furnace, forming stable compounds such as oxides.

Due to the mode with which said oxidation reaction is effected, the compound consists of extremely fine particles which form a significant fraction of the powder produced.

The presence of heavy metal oxides makes EAF powder particularly dangerous for the environment, requiring, according to the regulations in force, high costs for its abatement and disposal. The presence of the above and other commercially valuable elements, on the other hand, can make their recovery economically interesting.

The processes currently used for the recovery of heaving metals present in EAF process powders, are based on pyrometallurgic methods (Waelz, etc.), hydrometallurgic methods (Zincex, Ezinex, etc.) and combinations of these.

The Waelz pyrometallurgic process represents the most widely-used method for the recovery of heavy metals.

The Waelz process is based on a high temperature treatment (1200-1300° C.) of EAF powders, in a rotating furnace, with a reducing environment generated by the presence of coal.

The extraction of volatile metals such as zinc, takes place by means of chemical reactions which are activated in various areas of the rotating furnace. The shaking induced by the rotation of the hot cylindrical chamber causes a continuous re-mixing and close contact between the coal present and the powders.

The oxides are thus reduced forming combustion gases (such as CO) and metallic iron phases (Fe) and other elements of interest (for example lead and zinc).

At the treatment temperatures, the iron remains in solid phase in the charge, whereas other metals tend to evaporate reaching free zones of the furnace, which are relatively rich in oxygen. Here, the metallic vapours undergo a new oxidation with the consequent production of a very fine powder, which can be easily removed from the fumes in a collection area outside the furnace. The oxides are then reconverted to metallic phase with an independent process and subsequently commercialized.

Due to the complexity of the process, only the scale factor can ease the costs of said recovery. For this reason, few specialized centres have been created, which are capable of treating the steelwork powders of vast geographical areas. This situation, however, transfers the task of disposing the residues of the Waelz process or recovery processes in general, to specialized recovery companies.

A general objective of the present invention is to provide a process for the treatment of post-steelwork residues aimed at inertizing these and recovering the metals of commercial interest contained therein.

A particular objective of the present invention is to provide a pyrometallurgic process for the treatment of residues coming from post-steelwork processes of the Waelz type.

A further objective of the present invention is to provide a process with is economical in its embodiment.

The process according to the present invention is based on a treatment method of the slag leaving primary extraction processes of low-melting (and volatile) metals such as, for example but not exclusively, the Waelz process.

The solid residue leaving the Waelz process, does in fact normally contain a quantity of inert products which is slightly higher than 40%. The remaining quantity consists of iron oxides (about 35%) and volatile metals such as zinc and lead (about 5%), present in the form of oxides such as ZnO and PbO marked by a high environmental risk. The volumes, moreover, are practically the same at the inlet of the recycling system as the small percentages of high density materials extracted do not significantly influence the overall volume of the slag.

The process according to the invention is effected in an arc furnace for pyrometallurgic treatment directly connected to the outlet of the recovery process, for example, a Waelz process.

This has the following advantages:

to complete the recovery of zinc and lead still present in the residue;
to inertize the residue;
to significantly reduce the quantities of waste material;
to lower the disposal costs;
to produce a liquid metal with a high content of Carbon, Manganese and Silicon which can be sold on the market.

The additional costs, deriving from the insertion of the new recycling phase proposed by our invention, are largely compensated by the reduction in disposal costs of the Waelz residue, the commercialization of the liquid metal produced by our process and the greater quantity of zinc and lead totally recoverable from the EAR powders.

The balance makes the pyrometallurgic process advantageously sustainable and represents a future process for improving the recovery methods of scrap material.

In view of the above objectives, according to the present invention, a pyrometallurgic process is proposed, for the treatment of post-steelwork residues, having the characteristics specified in the enclosed claims.

The functional characteristics of the present invention, the structural characteristics of the equipment destined for said process in addition to its advantages with respect to the known art, will appear more evident from an examination of the following description, referring to the enclosed schematic drawings, in which.

With reference to the figures, the pyrometallurgic process for the treatment of post-steelwork residues according to the invention is of the "slag smelting" type, wherein the molten slag bath forms the reaction bed and is produced by the use of an electric furnace 1 suitable sized and adequate for the charging of the residue.

Figure 1:
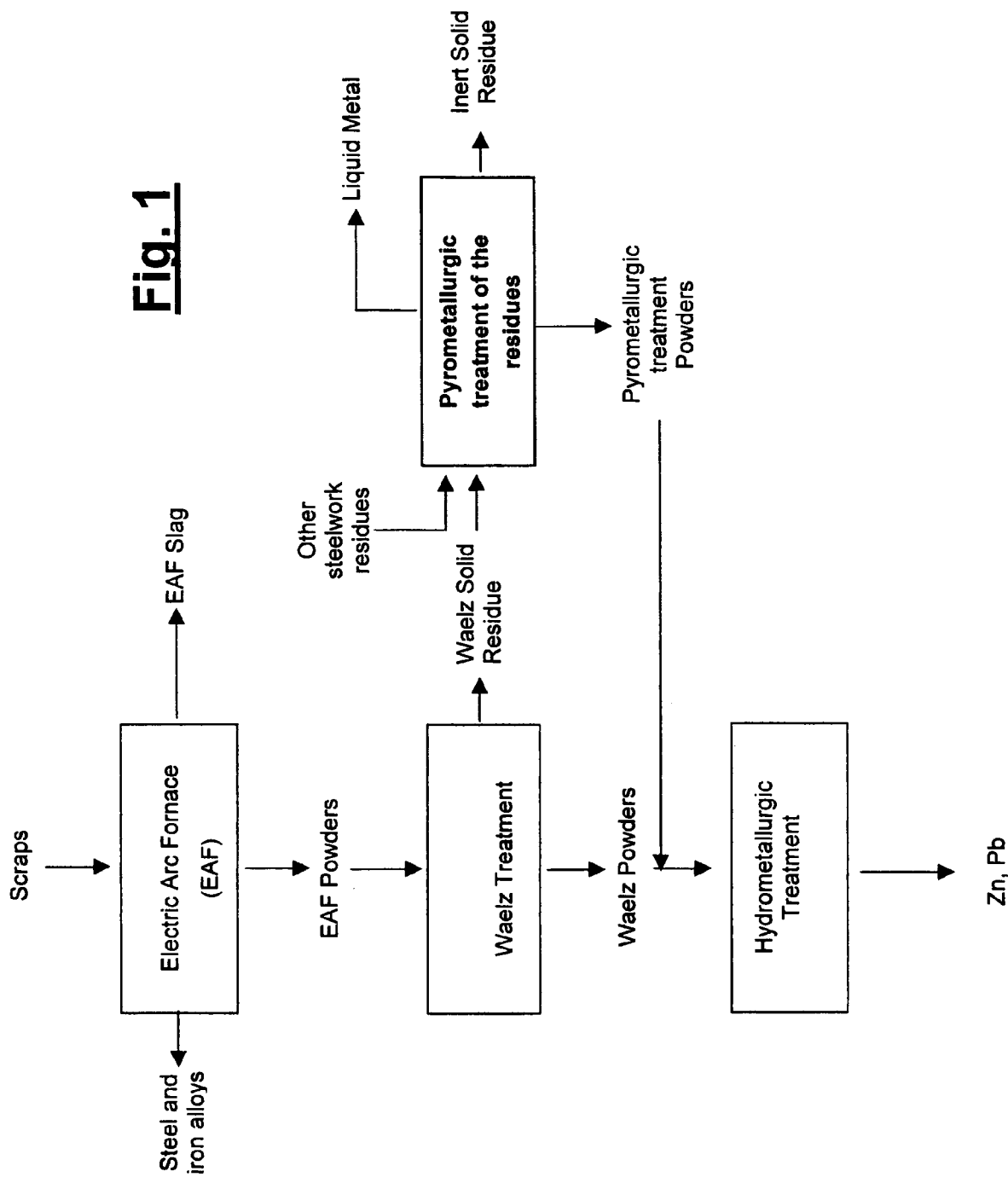
FIG. 1 is a process scheme according to the invention relating to the treatment of solid residues from the Waelz process.

With particular reference to FIG. 1, this indicates the process for the treatment of residues from a Waelz process, A indicates the EAF arc electric furnace, B the rotating furnace for the Waelz treatment and C the hydrometallurgic section for the treatment of the powders.

D indicates the pyrometallurgic treatment section of the residues (in the case in point Waelz) according to the process of the present invention. As indicated in the scheme of FIG. 1, the powders leaving the pyrometallurgic treatment according to the invention (section D), are collected and sent to the hydrometallurgic treatment together with those coming from the Waelz treatment (section B) and are then recovered.

In this scheme, the "distance" from the steelwork cycle (A,B,C) can also be observed, due to the characteristic of the present process of operating in a cascade with the extraction process of other valuable metals (such as Waelz) on slag normally destined for disposal or storage.

Figure 2:
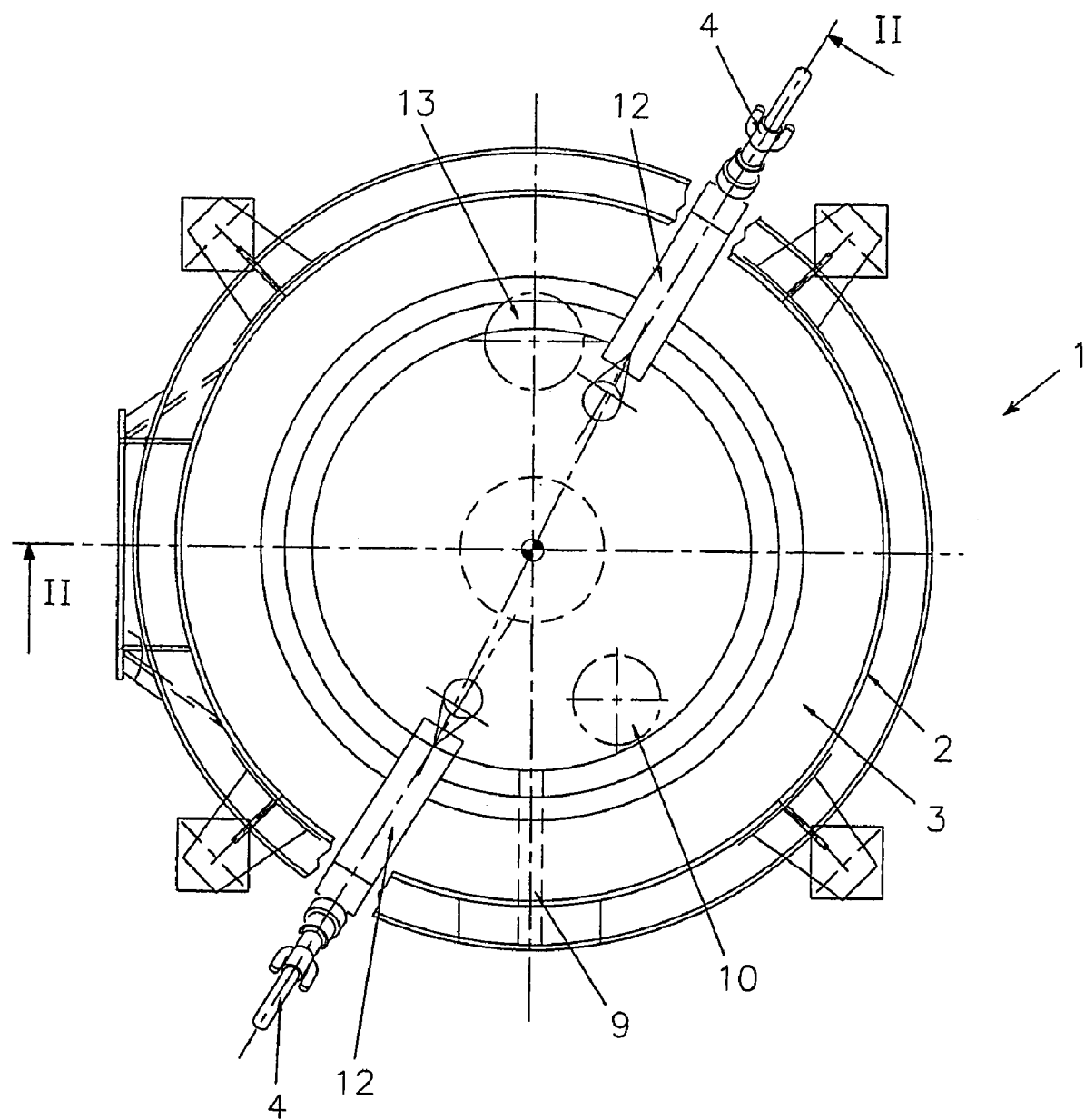
FIG. 2 is a plan schematic view of a furnace suitable for effecting the process according to the invention.
Figure 3:
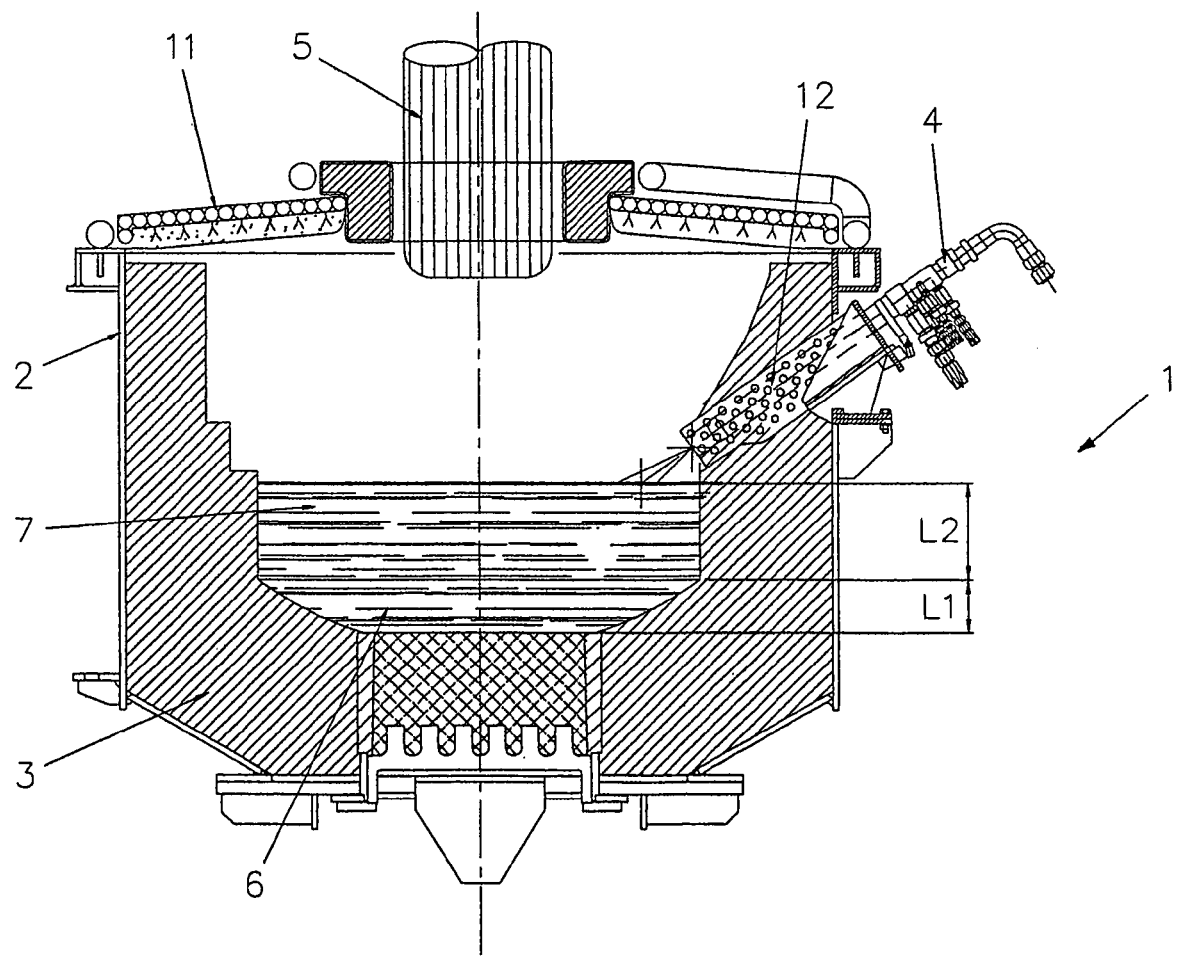
FIG. 3 is a schematic section according to the line II-II of FIG. 2.

In particular, with reference also to FIGS. 2 and 3, the electric furnace 1, in which the pyrometallurgic process, previously identified in section D, is effected, comprises a lower covering portion 2 and a vault 11.

The furnace 1 is of the direct or alternating current type, single-phase or three-phase, and is characterized by an arc-arc resistance functioning.

The furnace is therefore equipped with at least one electrode column 5 envisage for being lowered through the vault 11, and immersed in the slag consisting of the residue coming from the previous treatment, for example a Waelz process, even though the process can also be applied to other types of residues.

The lower portion 2 of the furnace is suitably lined by a refractory layer 3.

The Waelz residue, continuously discharged from the rotating furnace at a temperature of about 1000° C., feeds the electric furnace 1.

The feeding of the furnace 1 takes place through the vault 11 by means of one or more loading tubes 13 and can be effected continuously, semi-continuously or batchwise, or a combination of theses depending on how the slag, either cold or hot, is supplied.

The furnace is in fact capable of operating with slag coming directly from the primary recovery process (with Waelz, the slag is continuously available at a temperature of about 1000° C.), or using slag already stored and therefore under regime semi-continuous or batch feeding conditions at room temperature or any other temperature. The additives necessary for the process, such as coal, lime, flushing agents, etc., can be added by direct mixing with the Waelz residue (and charged into the electric furnace by gravity) or by their direct injection (for example in the slag) by means of lances.

The connection between the rotating Waelz furnace and the electric furnace 1 is effected through a system capable of raising the feeding material and providing for the possible addition of additives.

A hopper situated above the furnace 1 allows the Waelz residue to be accumulated as it waits to be charged into the treatment furnace.

The "process lung" thus formed allows fluctuations and/or interruptions to be handled during the running of the electric furnace which effects the pyrometallurgic process.

At the beginning of the treatment, a metal bath 6 (also called liquid foot) and an overlying layer of process slag 7, both remaining from the previous casting, are present in the electric furnace.

The electric charge produces the arc which supplies part of the energy necessary for the system.

The process slag 7 represents the reaction bed of the pyrometallurgic treatment.

The Waelz residue, falling from the vault 11, slowly passes through the reaction bed, the slag 7.

In this passage, there is a partial melting and a rapid reduction of the metal oxides ($FeO$, $Fe_2O_3$, $ZnO$, $PbO$, etc.), present therein, due to the carbon and its oxides freely circulating in the process slag 7 (slag smelting).

Once the non-volatile elements (such as, for example, Fe, Si, Mn, Cu) have melted, they finish passing through the reaction bed 7 and feed the underlying bath 6 entering into solution with the liquid metal present therein.

The non-reducible oxides present in the Waelz residue, such as $CaO$, $MgO$, $Al_2O_3$, etc., with a much lower density than the underlying liquid metal, tend to float contributing to the formation of the process slag 7.

The addition of specific additives gives the process slag a moderate basicity. This contributes to withholding and fixing elements such as halogens (Cl, F and S) and compounds such as Ca salts.

The englobement of these components in the silicate matrix thus determines the particular inertia characteristics of the slag produced which, once it has cooled, can be used as such, without any particular further treatment or prescriptions.

Other additives, moreover, regulate the viscosity and electric conductivity in order to optimize the pyrometallurgic process and minimize the consumption of the furnace linings 3.

In addition to the slag smelting of the Waelz residue, analogously to what takes place in an EAF, there is a "fumigation" process. Various volatile metals, among which zinc, lead and alkalis are released into the atmosphere of the furnace.

A possible post-combustion effected in the area of the furnace overlying the slag 7, accelerates recombination with oxygen.

This allows the formation of oxides with the consequent generation of powders enriched in $ZnO$ and $PbO$ with a very fine particle-size. These powders follow the fumes along the duct 10 and, once separated, they can be used similarly to those generated by processes such as the Waelz process (see enclosed scheme).

They can be used, for example, for feeding possible hydrometallurgic processes downstream or sold, as such, for the production of metallic zinc and lead.

The high temperatures obtained in the reactor and in the post-combustion gaseous streams cause the complete destruction of the organic components possibly present and prevent the formation of dangerous compounds such as dioxins and furans.

At the end of the treatment in the electric furnace 1, there is a cast iron bath 6 having a height L1 and an inert process slag 7 having a height L2.

The liquid metal and slag are extracted (tapped) from the furnace through casting holes 9, for example, produced through the refractory layer 3.

The casting holes, situated at different heights, allow the liquid metal and slag to be extracted separately; a further hole is envisaged for allowing the complete emptying of the furnace.

The casting holes are opened and closed by means of a specific machine for the operation. Alternatively, there can be a tilting system of the furnace for the sequential pouring of the slag and metal. In this case, the feeding of the Waelz residue to the electric furnace is suspended. Another possibility consists in the continuous tapping of the slag and molten metal. In the case of batch tapping, only the quantity of metal and slag added for reaching the initial conditions, is discharged from the furnace. In this case and in the case of tapping by means of "casting holes", the feeding can be maintained in continuous.

The process according to the invention allows the treatment of Waelz residues producing an inert process slag, a sellable liquid metal and powders which can be treated with the hydrometallurgic process, for example, for the recovery of lead, zinc or other metals.

In order to sustain the reactions which take place during the pyrometallurgic treatment, the reaction bed 7 must be suitably fed not only by chemical reagents but also by energy. This energy is transferred from the electrode column 5 (or electrodes) using arc and/or arc resistance functioning.

The energy transfer is effected thanks to the passage of an electric current through the layer of process slag 7 and underlying metallic bath 6. The electric current supplied by the feeding is transformed into energy according to the Joule law, wherein the power is defined as $P=R*I^2$. The irradiation produced by the possible electric arc also contributes to transferring the energy to the slag.

A further energy source is represented by the partial combustion of the coal injected, the combustion of the metal injected and the partial post-combustion of the CO in the area above the slag. The injections of coal, oxygen, methane and additives are effected by means of wall lances 4, suitably sized and directed inside the furnace. These lances 4 advantageously have a lining or cooling block 12, which has a protective function, shielding the lance from the extreme thermal conditions present in the furnace and prolonging its operative life.

The possibility of easily intervening on the main process parameters (temperature and chemical composition of the reaction bed, electric and chemical power transferred to the reaction bed) and the type of charging system of the raw materials, characterized by an inlet system by gravity and/or an insufflation system, make the process particularly versatile. The technology proposed therefore allows numerous pyrometallurgic processes for the treatment of steelwork residues to be applied.

Other steelwork scraps such as lamination chips can also be treated alternatively to or together with the Waelz slag.

The process according to the invention consequently comprises the following phases:

preparing a furnace 1 of the electric type, equipped with at least one electrode column 5, suitable for the introduction of the residues, for example of the Waelz type;

preparing the residues, in a hopper with the possibility of mixing with additives and reaction elements;

introducing the residues, together with suitable additives and chemical reagents, into the furnace; the homogeneous distribution on the surface of the reaction bed 7 of said residues is preferred;

introducing directly into the slag, by means of lances 4, additives, flushing and reaction elements to correct the composition of the slag 7, in order to optimize the chemical reactions with the residues, as well as other process parameters;

reacting the residues with the slag 7 to obtain:

a) separation of the liquid metallic phases which are added to the metal bath 6 to form a sellable liquid metal;

b) separation of the metallic volatile elements in vapour phase which, when transferred to the free zone of the furnace, possibly with the help of post-combustion, recombine with the oxygen for the formation of oxides and consequently of powder, said powder subsequently being sent with the fumes in the duct 10, separated and made available for sale or other uses;

c) separation of the stable phases, typically ceramic and/or silicates, which form the inert phase of the slag 7;

d) separation and neutralization of other elements risky for the environment present in the residues themselves. This reaction makes the slag 7 inert;

supplying energy by means of an electrode column 5 to the reaction bed 7 to sustain the above reactions;

extracting the metallic bath 6 and inert slag 7 by means of a "tapping hole" process 9 or by tilting of the furnace, either continuously or in semi-continuous to reintegrate the initial conditions.

Once the above products have been treated (for example cooled) they are ready for commercialization, disposal or other uses.

The pyrometallurgic process for the treatment of residues consequently has a "system lung" (for example the above hopper) for suspending the feeding of said residues to allow various operations to be effected in the furnace, such as, for example, discharging of the liquid metal 6 and the slag 7.

From what is described above with reference to the figures, it is evident how a pyrometallurgic process for the treatment of residues according to the invention is particularly useful and advantageous. The objectives listed in the introduction of the description have therefore been achieved.

The process procedure as also the equipment destined for its embodiment according to the invention, can obviously differ from those described and indicated for purely illustrative and non-limiting reasons in the drawings.

The protective scope of the invention is therefore delimited by the enclosed claims.

The invention claimed is:

1. A pyromettallurgic process for the treatment of post-steelwork residues of a Waelz process in the form of melted slag, comprising the steps of:

providing:
an EAF arc electric furnace (A):
a rotating furnace (B) of a Waelz process fed by EAF powders for a recovery treatment;
a pyrometallurgic treatment section (D) in the form of an electric furnace (1), suitable for the introduction of residues;

a hydrometallurgic section (C) for the treatment of the powders collected from said rotating furnace (B) and said pyrometallurgic treatment section (D);

preparing the residues from the Waelz process together with other post-steelworks residues, in a hopper and optionally adding additives and reaction elements;

starting the pyrometallurgic treatment in pyrometallurgic treatment section (D) with a metal bath (6) or liquid foot and an overlying layer of slag (7), both remaining from the previous casting, already present in the electric furnace;

introducing the residues from the Waelz process together with other post-steelworks residues, together with suitable additives including at least one carbon and chemical reagents, into the furnace (1) of said pyrometallurgic treatment section (D), in an homogeneous distribution effected on the surface of the slag (7);

introducing directly into the slag (7), by means of lances (4), additive, flushing and reaction elements to correct the composition of the slag (7);

reacting the residues with the slag (7) to obtain:

a) separation of the liquid metallic phases which are added to the metal bath (6) to form a sellable liquid metal;

b) separation of the metallic volatile elements in vapour phase which, when transferred to the free zone of the furnace (1), possibly with the help of post-combustion, recombine with oxygen for the formation of oxide powder;

c) separation of the stable ceramic and/or silicate phases which form the inert phase of the slag (7);

d) (separation and neutralization of other elements risky for the environment that are present in the residues to provides inert slag (7); and supplying energy by means of an electrode column (5) to the reaction bed or slag (7) to sustain the reactions set forth above;

extracting the metallic bath (6) and inert slag (7);

extracting the powders leaving the pyrometallurgic treatment section (D), collecting and sending the powders to the hydrometallurgic treatment section (C) together with the powder coming from the rotating furnace (B); and obtaining zinc and lead from hydrometallurgic treatment section (C).

2. The pyrometallurgic process according to claim 1, wherein said furnace (1) is a direct or alternating current, single-phase or three-phase furnace equipped with at least one electrode column (5).

3. The pyrometallurgic process according to claim 1, wherein there is at least one device for the moving of said residues between the pyrometallurgic rotating furnace (B) and the electric furnace (1).

4. The pyrometallurgic process according to claim 1, wherein there is at least one mixing system of said residues with additives, flushing agents and chemical reagents suitable for the embodiment of the process.

5. The pyrometallurgic process according to claim 1, wherein there is a hopper situated above the furnace 1 to allow the Waelz residue to be accumulated as it waits to be charged into the treatment furnace.

6. The pyrometallurgic process according to claim 1, wherein the powders formed are separated from the valuable metal oxides zinc and lead.

7. The pyrometallurgic process according to claim 1, wherein the extraction of the liquid metal (6) takes place batchwise by means of tapping holes (9).

8. The pyrometallurgic process according to claim 1, wherein the extraction of the liquid metal (6) takes place batchwise by tilting the furnace.

9. The pyrometallurgic process according to claim 1, wherein the extraction of the liquid metal (6) takes place in continuous or semi-continuous.

10. The pyrometallurgic process according to claim 1, wherein the extraction of the inert slag (7) takes place batchwise by means of tapping holes (9).

11. The pyrometallurgic process according to claim 1, wherein the extraction of the inert slag (7) takes place batchwise by the tilting of the furnace.

12. The pyrometallurgic process according to claim 1, wherein the extraction of the inert slag (7) takes place in continuous or semi-continuous.

13. The pyrometallurgic process according to claim 1, wherein at least part of the process energy is fed by means of the electrode column (5) using arc and/or arc resistance functioning.

14. The pyrometallurgic process according to claim 1, wherein further energy is supplied by means of partial combustion of the coal injected, combustion of the methane injected and the partial post-combustion of the carbon monoxide in the area above the slag, in addition to irradiation by the possible electric arc.

15. The pyrometallurgic process according to claim 1, wherein the thermal supply is integrated by chemical energy produced by the insufflation of oxygen and/or methane, or another fuel, by means of lances (4).

16. The pyrometallurgic process according to claim 1, wherein said lances (4) are insulated by means of a lining or cooling block (12).

17. The pyrometallurgic process according to claim 1, wherein said residue is continuously fed.

18. The pyrometallurgic process according to claim 1, wherein said residue passes through said slag (7), where melting and reduction of the oxides with carbon, takes place.

* * * * *